United States Patent
Zhou et al.

(10) Patent No.: US 10,239,402 B2
(45) Date of Patent: Mar. 26, 2019

(54) HYBRID VEHICLE WITH RANKINE CYCLE SYSTEM, IN-WHEEL MOTOR AND POWER MODULE INTEGRATED WITH POWER TRAIN COMPONENTS

(71) Applicant: TOYOTA MOTOR ENGINEERING & MANUFACTURING NORTH AMERICA, INC., Erlanger, KY (US)

(72) Inventors: Feng Zhou, South Lyon, MI (US); Ercan Mehmet Dede, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 184 days.

(21) Appl. No.: 15/451,849

(22) Filed: Mar. 7, 2017

(65) Prior Publication Data
US 2018/0257480 A1  Sep. 13, 2018

(51) Int. Cl.
*B60K 11/04* (2006.01)
*B60L 11/18* (2006.01)
*B60K 1/04* (2019.01)
*B60K 7/00* (2006.01)
*B60L 15/00* (2006.01)
(Continued)

(52) U.S. Cl.
CPC ............... *B60K 11/04* (2013.01); *B60K 1/04* (2013.01); *B60K 7/0007* (2013.01); *B60L 11/1874* (2013.01); *B60L 11/1877* (2013.01); *B60L 15/007* (2013.01); *F25B 5/04* (2013.01); *F25B 11/02* (2013.01); *B60L 2210/14* (2013.01); *B60L 2210/40* (2013.01); *B60Y 2306/05* (2013.01); *B60Y 2400/112* (2013.01);
(Continued)

(58) Field of Classification Search
CPC ........ B60K 11/04; B60K 1/04; B60K 7/0007; B60L 15/007; B60L 11/1874; B60L 11/1877; B60L 2210/40; B60L 2210/14; F25B 11/02; F25B 5/04; F25B 2600/2501; F25B 2400/14; Y10S 903/904; B60Y 2400/112; B60Y 2400/442; B60Y 2306/05
See application file for complete search history.

(56) References Cited

U.S. PATENT DOCUMENTS 6,323,613 B1  11/2001  Hara et al.
7,051,823 B2   5/2006  Bosch et al.
(Continued)

FOREIGN PATENT DOCUMENTS

FR          3 005 810       11/2014

*Primary Examiner* — Jared Fureman
*Assistant Examiner* — Michael Warmflash
(74) *Attorney, Agent, or Firm* — Oblon, McClelland, Maier & Neustadt, L.L.P.

(57) ABSTRACT

A hybrid vehicle including one or more in-wheel motors, a power electronics supplying power to the one or more in-wheel motors, and a Rankine cycle system is described. The Rankine cycle system includes a pump driving a working fluid, a first three-way valve having an input, a first output, and a second output. The Rankine cycle system also includes, a second three-way valve having a first input, a second input, and an output, an evaporator receiving the working fluid from the output of the second three-way valve and heating the working fluid utilizing heat from an exhaust gas from an engine, an expander receiving the working fluid from the evaporator, and a radiator cooling the working fluid received from the expander.

17 Claims, 10 Drawing Sheets

(51) Int. Cl.
*F25B 11/02* (2006.01)
*F25B 5/04* (2006.01)

(52) U.S. Cl.
CPC ..... *B60Y 2400/442* (2013.01); *F25B 2400/14* (2013.01); *F25B 2600/2501* (2013.01); *Y10S 903/904* (2013.01)

(56) References Cited

U.S. PATENT DOCUMENTS

| | | | |
|---|---|---|---|
| 7,211,912 B2 | 5/2007 | Takenaka | |
| 7,475,541 B2 * | 1/2009 | Ibaraki | F01K 23/065 |
| | | | 60/618 |
| 8,739,531 B2 | 6/2014 | Teng et al. | |
| 9,030,063 B2 | 5/2015 | Rawlinson et al. | |
| 9,560,790 B2 * | 1/2017 | Joshi | H05K 7/20318 |
| 10,082,047 B2 * | 9/2018 | Joshi | F01K 23/04 |
| 2004/0050052 A1 * | 3/2004 | Niikura | F01K 23/065 |
| | | | 60/670 |
| 2007/0284157 A1 | 12/2007 | Heller et al. | |
| 2009/0271088 A1 * | 10/2009 | Langham | F01B 11/004 |
| | | | 701/102 |
| 2012/0119573 A1 | 5/2012 | Turudic | |
| 2013/0174544 A1 | 7/2013 | Valetutti | |
| 2015/0217623 A1 * | 8/2015 | Hatakeyama | B60L 1/003 |
| | | | 165/42 |
| 2016/0123637 A1 | 5/2016 | Moreno et al. | |
| 2016/0201520 A1 | 7/2016 | Zhou | |
| 2018/0257479 A1 * | 9/2018 | Zhou | B60K 11/04 |
| 2018/0257481 A1 * | 9/2018 | Zhou | B60K 11/04 |

\* cited by examiner

HYBRID VEHICLE WITH RANKINE CYCLE SYSTEM, IN-WHEEL MOTOR AND POWER MODULE INTEGRATED WITH POWER TRAIN COMPONENTS

BACKGROUND

Field of the Disclosure

This disclosure relates generally to improvements to hybrid vehicle. More particularly the present disclosure relates to improving the fuel efficiency of hybrid vehicles (HV), fuel cell vehicles (FCV) and/or a plug-in hybrid vehicle (PHV) by integrating Rankine Cycle system with other technologies such as power electronics cooling, turbocharging, and in-wheel motor.

Description of the Related Art

Conventional internal combustion engine (ICE) vehicles are reaching their technical limits and will. not be able to meet the fuel economy requirement without additional measures. While, fully electric vehicles (EV) have very high fuel economy and low carbon-dioxide ($CO_2$) emission; however, their short driving range and long battery charging time limit the acceptance of the EV. On the other hand, a hybrid electric vehicle is a compromise of traditional ICE vehicle and the EV. A hybrid vehicle can utilize both ICE and electric energy to enable operation over a long distance. Additional, different waste energy sources can be utilized to further improve the efficiency of the hybrid vehicle. For example using a Rankine Cycle (RC) system.

The Rankine Cycle is a thermodynamic cycle that converts thermal energy into mechanical work and is commonly found in thermal power generation plants. The RC system includes four main components: an evaporator; an expander; a condenser; and a pump connected to form a flow loop of a typical RC system. The pump drives a working fluid to circulate through the loop, and the evaporator utilizes a waste heat source to vaporize the working fluid. The fluid vapor expands in the expander and converts thermal energy into mechanical power output. Then, the expanded vapor flows through a condenser to convert back into liquid phase, thus completing the cycle.

SUMMARY

According to an embodiment of the present disclosure, there is provided a hybrid vehicle. The hybrid vehicle includes one or more in-wheel motors, a power electronics supplying power to the one or more in-wheel motors, and a Rankine cycle system. The Rankine cycle system includes a pump driving a working fluid through the Rankine cycle system, a heat exchanger receiving the working fluid from to the pump and connected to the power electronics to cool the power electronics, an evaporator heating the working fluid received from the heat exchanger utilizing heat from an exhaust gas from an engine, an expander receiving the working fluid from the evaporator, and a radiator cooling the working fluid received from the expander.

The hybrid vehicle further includes a preheater located between the heat exchanger and the evaporator. The preheater receives engine coolant to heat the working fluid before passing the working fluid to the evaporator.

The hybrid vehicle further includes a low temperature recuperator receiving the working fluid at a first temperature from the heat exchanger and the working fluid at a second temperature from the expander. The second temperature is greater than the first temperature.

The hybrid vehicle further includes a high temperature recuperator receiving the working fluid at a third temperature from the preheater and the working fluid at a fourth temperature from the expander. The third temperature is greater than the fourth temperature.

The hybrid vehicle further includes an exhaust gas recirculation loop around the evaporator partially recirculating the exhaust gas from the output of the evaporator to the input of the evaporator.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

It is to be understood that terms such as "front," "rear," and the like that may be used herein merely describe points of reference and do not necessarily limit embodiments of the present disclosure to any particular orientation or configuration. Furthermore, terms such as "first," "second," "third," etc., merely identify one of a number of portions, components, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Current hybrid vehicles include a transmission system with an electric motors and an engine to drive the vehicle. The hybrid vehicle can operate on the electric motor, engine or derive a driving power from both the electric motor and the engine, depending on the driving conditions to achieve a highest efficiency level. Furthermore, when necessary, the transmission system drives the wheels while simultaneously generating electricity using a generator.

However, the hybrid vehicles are limited by the thermal efficiency of internal combustion engine (ICE) which is generally below 40%. It has been estimated that the thermal efficiency of a modern internal combustion (IC) engine is limited to 20-40% while approximately 33% of the fuel energy from a typical medium-size passenger vehicle is carried away by exhaust gases and approximately 33% is carried away by engine cooling water in an urban traffic conditions.

The waste heat can be harvested by incorporating a Rankine Cycle (RC) system in automobile applications to boost the fuel economy. However, in contrast to typical low-grade waste heat applications such as heat engines in a thermal power plant, automobiles have limited space for the RC system integration. Furthermore, the waste heat is relatively unstable, for example, in terms of temperature variations. As an add-on system to an existing automobile, the RC system integration can lead several undesirable component interactions and consequences, as discussed below.

Firstly, an increased vehicle weight cannot be avoided due to additional components of the RC system. The increased weight demands more tractive effort to accelerate the vehicle and also imparts more rolling resistance on the tires.

Secondly, a heat exchanger should be added to transfer the heat from the exhaust gas to a working fluid of the RC system. The added pressure drop from the heat exchanger causes an increase in an engine back pressure that affects the engine performance due to loss in engine power.

Thirdly, the heat from the RC condenser should be dissipated to the environment, which increases the cooling demand of the automobile. An extra condenser can occupy extra space for installation and also increase air resistance.

Finally, interaction between the RC system and the vehicle includes utilizing the RC expander power output to drive the wheels. In a conventional hybrid power train, the power of the motor is transferred to the wheels via a long drive shaft, which rotates to transmit the power to the wheels.

FIGS. 1A, 1B, 1C, 2A, 2B, 3A, 3B, 3C, 4A, and 4B illustrate four different configurations of the Rankine Cycle (RC) system incorporated in two different types of hybrid vehicles according to the present disclosure. The two different types of hybrid vehicles can be broadly classified into: a vehicle with a power split device; and a vehicle with no power split device. Furthermore, a hybrid vehicle can be a Front wheel drive, rear wheel drive, or all-wheel drive. in the present disclosure, the hybrid vehicles are front vehicle drive for discussion purposes only and do not limit the scope of the disclosure. It can be appreciated by a person skilled in art that he present disclosure can be applied to other type of vehicles such as vehicles with a rear wheel drive, and all-wheel drive.

Furthermore, the power electronics unit is split into different components and integrated with power train components. Therefore, the space of conventional power electronics can be saved.

The power electronics includes three main components, DC-AC inverter which converts DC power from battery to AC power to drive the motors, AC-DC inverter which converts AC power from generator to DC power to charge the batter and/or a boost converter which boosts the battery voltage (approximately 200V) to higher voltage (approximately 650V) to power the motors. In the current disclosure, the DC-AC inverter can be integrated with in-wheel motors; the AC-DC inverter is integrated with generator; the boost converter is integrated with battery or has its own package, or a combination thereof As such, the cooling of power electronics components can be shared with the power train components. For example, the DC-AC inverter and AC-DC inverter can be cooled together with the in-wheel motors and the generator. The boost converter can be cooled along with the battery. Such a distributed configuration of the power electronics can save space in the hybrid vehicles for better RC integration, allow an increased battery size, and/or allow the vehicle to be more compact.

Figure 1A:
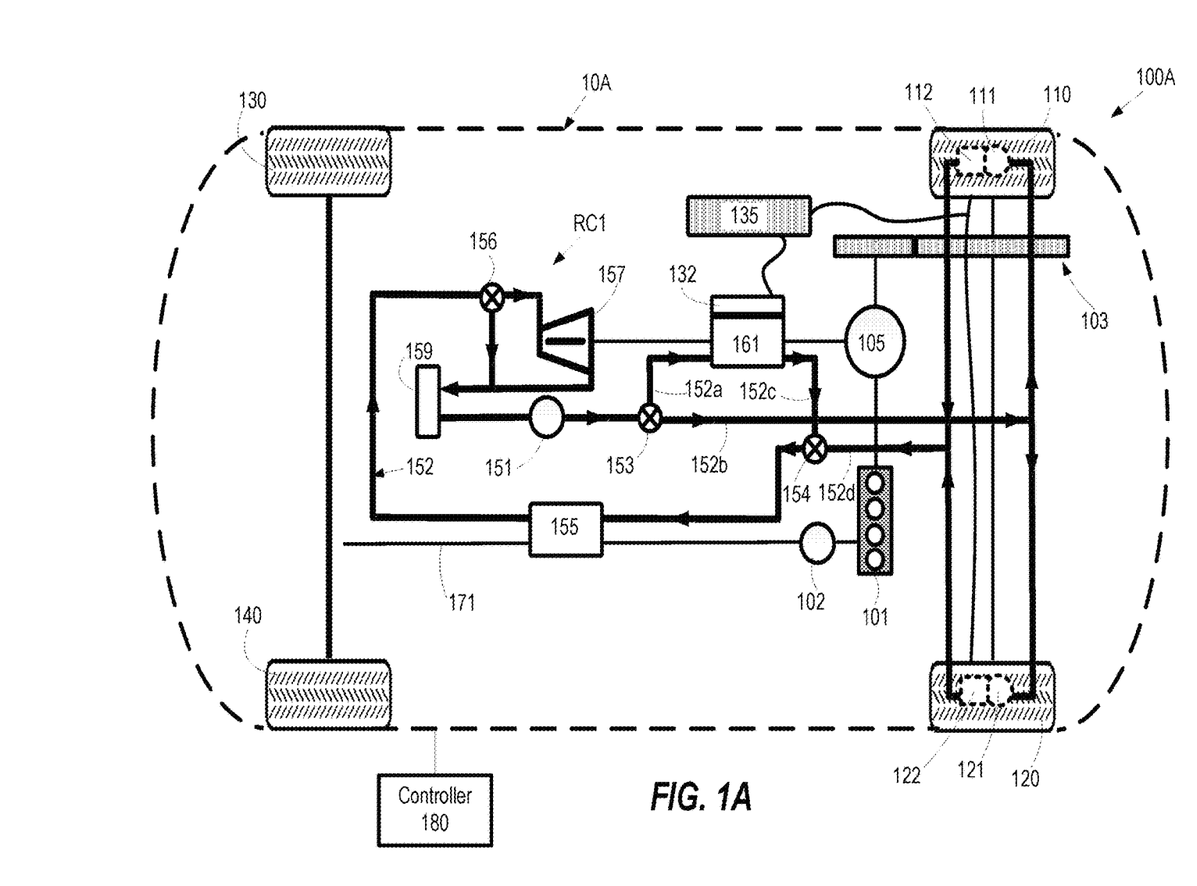
FIG. 1A illustrates a vehicle with a power split incorporating a first Rankine Cycle system according to an exemplary embodiment of the present disclosure.

FIG. 1A illustrates a hybrid vehicle 100A having a power split device 105 and incorporating a first Rankine Cycle system RC1 according to an exemplary embodiment of the present disclosure. The hybrid vehicle 100A includes a vehicle body 10A, two front wheels 110 and 120 fitted with in-wheel motors 111 and 121, respectively, two rear wheels 130 and 140, an engine 101 connected to a turbo charger 102, a transmission 103, the power split device 105, a battery unit 135, a generator 161 integrated with an AC-DC inverter 132, and the first Rankine Cycle system RC1 (referred as first RC system RC1, hereinafter).

The in-wheel motor 111 and 121 (also referred as wheel motor, wheel hub drive, hub motor or wheel hub motor) is an electric motor that is incorporated into a hub of a wheel and drives the wheel directly. The conventional hybrid vehicle includes one motor that drives a transmission system to supply the rotational input to the wheels. On the other hand, use of in-wheel motors 111 and 121 saves space and enables integration of the first RC system RC1 with the hybrid vehicle 100A. Alternatively, the hybrid vehicle 100A can include two or more wheels fitted with two or more motors. For example, three motors for a three-wheeler, four motors in case of a four-wheeler, four motors in case of a six wheeler, etc.

The battery unit 135 includes a battery and a boost converter. The boost converter can boost the battery voltage (approximately 200V) to higher voltage (approximately 650V). Furthermore, the in-wheel motors 111 and 121 are integrated with DC-AC inverters 112 and 122, respectively, which convert the DC power from the battery to AC power to drive the motors 111 and 121. The AC-DC inverter 132, the battery unit 135, and the DC-AC inverters 112 and 122 are connected by electric wires to form the power electronics.

The power electronics is a device that can convert the electric power from a direct current (DC) to alternating current (AC) or vice-versa, and can boost the battery voltage to a higher value to drive the in-wheel motors 111 and 121. In operation, the different components of the power electronics including AC-DC inverter 132, a boost converter integrated with the battery unit 135, and the DC-AC inverters 112 and 122, generate a substantial amount of heat, as such requires a cooling system. The power electronics can supply electric power to drive the hybrid vehicle 100A.

The engine 101 can also generate power to drive the hybrid vehicle 100A. The power is transmitted to the front wheels 110 and 120 via the transmission 103 and the power split device 105. The power split device 105 is a device that splits the power transmitted by the engine 101 into two components—one to drives the front wheels 110 and 120, and second to drive the generator 161. The exhaust gases from the engine 101 are carried through an exhaust pipe 171. Optionally, the exhaust gases can be passed through the turbo charger 102, which is commonly used in turbo-charged automobiles.

The front wheels 110 and 120 can be driven by the rotational input from the engine 101, the in-wheel motors 111 and 121, or a combination thereof. For example, the power from the engine 101 can be transmitted via the transmission 103 to the front wheels 110 and 120. The power from the battery unit 135 can be transmitted via the DC-AC inverters 112 and 121 to the in-wheel motors 111 and 121, respectively.

A typical cooling system has three main components: a cold plate heat exchanger; a radiator; and a pump. The hybrid vehicles are projecting an increasing demand of higher performance combined with small sized power electronics module resulting in an increased heat dissipation requirement and a better and efficient cooling system that can be accommodated in the hybrid vehicle with limited space for additional components.

The first RC system RC1 includes a pump 151, a first three-way valve 153, a second three-way valve 154, an evaporator 155, an expander 157, and a radiator 159. The aforementioned components are connected by a RC piping system 152 to form a cooling loop for cooling the power electronic components. The RC piping system 152 is a piping system including pipes transporting working fluid (also referred as a refrigerant) through different components of the first RC system RC1 the power electronics, or other heat sources. A refrigerant such as R245fa, HFE7100, HFC 134a etc. is typically used as the working fluid in a two-phase power electronics cooling loop. Different fluids may be selected depending on the type of power devices and its operation temperature.

The pump 151 can be a positive displacement type of pump, such as gear pump. However, the other appropriate pumps such as a centrifugal pump can be used and does not limit the scope of the present disclosure.

The heat exchanger 153 can be a cold plate heat exchanger. The heat exchanger 153 can be attached to power electronics 132 with thermal interface material (TIM) therebetween. The cold plate has an inlet and an outlet for the working fluid to circulate through the heat exchanger 153. The working fluid flows in and out the cold plate and absorb heat dissipated by the power electronics 132. The heat exchanger 155 can be a shell-and-tube type of heat exchanger. The working fluid (coolant) can flow within the tubes and the hot exhaust gas can flow outside of the tube. The tubes can have fins on the outside surface.

The radiator 159 has conduits through which the working fluid can flow and cool down to a liquid form due to conduction effect. The conduits can have circular or flat or any other shape of cross-section. The radiator 159 can have fins on the outside surface. The working fluid flows within the tube and air flows outside of the tube to carry away the heat.

The first three-ways valve 153 has one input connected to the pump 151 and two output ports connected to pipes 152a and 152b, respectively. While, the second three-way valve 154 has two input ports connected to the pipes 152c and 152d, respectively, and one output port connected to the evaporator 155.

The pump 151 is connected to the input of the first three-way valve 153. At a first output of the first three-way valve 153, the pipe 152a is connected to the generator 161 to extract heat from the AC-DC inverter 132. At the second output of the first three-way valve 153 the pipe 152b is connected to the DC-AC inverters 112 and 122 to extract heat from the inverters 112 and 122 and the motors 111 and 121. As such, heat can be simultaneously extracted from more than one component such as the AC-DC inverter, 132 and the DC-AC inverters 112 and 122.

The cooling structure for generator 161 and the AC-DC inverter 132 is connected to the first input of the second three-way valve 154 via the pipe 152c. the second input of the second three-way valve 154 is connected to the cooling structure for DC-AC inverters 112 and 122, and the motors 111 and 121 via the pipe 152d. As such, the second three-way valve 154 can simultaneously receive working fluid (in a heated state) from more than one component such as the AC-DC inverter, 132 and the DC-AC inverters 112 and 122. Thus, providing two three-way valves allows cooling of multiple components, and can improve the thermal efficiency of the hybrid vehicle 100A. The cooling structure for the generator 161 and the AC-DC inverter 132 and the cooling structure for DC-AC inverters 112 and 122, and the motors 111 and 121 can similar to the heat exchanger 153.

The output of the second valve 154 is connected to the evaporator 155, which is coupled to the exhaust pipe 171 to extract heat from the exhaust gas passing through the exhaust pipe 171. The evaporator 155 is connected to the expander 157, which is coupled to the generator 161, for example via a shaft. The expander 157 is connected to the radiator 159, which is further connected to the pump 151 to form a closed loop.

The evaporator 155 is a heat exchanger that evaporates the working fluid using the heat from exhaust gas in the exhaust pipe 171. Then, the working fluid (which is in a form of a vapor-liquid mixture) flows into the expander 157. As the working fluid expands in the expander 157, mechanical output is produced. The output from the expander 157 can be input to the generator 161 via a shaft to generate electricity. The electricity generated can be used to charge the battery unit 135. The generator 161 can also receive power from the engine 100 to generate electricity.

The working fluid is further passed through the radiator 159, different from a radiator typically used for cooling engine. The radiator 159 to cool the working fluid and convert it to liquid state before passing the working fluid to the pump 151. The radiator 159 is a commonly used component in an automobile to cool the engine 101.

Optionally, a bypass valve 156 can be included at an input side of the expander 157. The bypass valve 156 can allow the working fluid to bypass the expander 157 and direct the working fluid to the radiator 159, when the engine is not running.

The pump 151 can be powered be the battery unit 135. Alternatively or in addition, the engine 101. Further, the pump 151 can receive input commands such as on and off from a controller 180. The controller 180 can configured to control the pump 151 and/or the bypass valve 156 to control flow of the working fluid through the first RC system RC1. The controller can be an electronic control unit (ECU), commonly used in a hybrid vehicle. The functions of the controller 180 such as switching a pump on or off, and controlling the opening and closing of the valves 153, 154 and/or 156 can be implemented in as a separate circuitry or as sub-module of the ECU.

The controller 180 can receive data from different sensors such as a temperature sensor (not illustrated), a pressure sensor (not illustrated), ignition sensor (not illustrated), etc. One or more temperature sensor can detect the temperature of working fluid and/or the temperature of the power electronics. The pressure sensor can detect the pressure of the working fluid. The ignition sensor can detect whether the engine 101 is on or off. Based the on the sensor data, the controller 180 can determine the control command. For example, if temperature of the power electronics increases (or decrease), the controller 180 can increase (or decrease) the speed of the pump 151 to increase (or decrease) the flow rate of the working fluid through the first RC system RC1, thus allowing fast (or slow) cooling of the power electronics. If the ignition is off, the controller 180 can close the bypass valve 156. Further, the controller 180 can implement optimization algorithms to optimize the cooling process of the power electronics.

The first RC system RC1 can be integrated in the hybrid vehicle 100A with or without the turbo charger 102. The first RC system RC1 operating in conjunction with a turbo-charged engine (e.g., engine 101 connected to the turbocharger 102) provides advantages over a naturally aspirated engines (i.e., no turbo charger 102). The evaporator 155 causes a pressure drop across the engine 101 that affects the engine performance and is highly undesirable. Thus, a turbocharged engine can serve two purposes. First, the turbo charger 102 can utilize the kinetic energy of the exhaust gas to compress the air at the intake of the engine 101 for higher engine performance. Second, the turbocharger can decrease the negative effect of the increased engine back pressure due to the RC integration. However, the turbo charger 102 can be omitted from proposed first RC system RC1 of the hybrid vehicle 100A, as such does not limit the scope of the present disclosure.

Figure 1B:
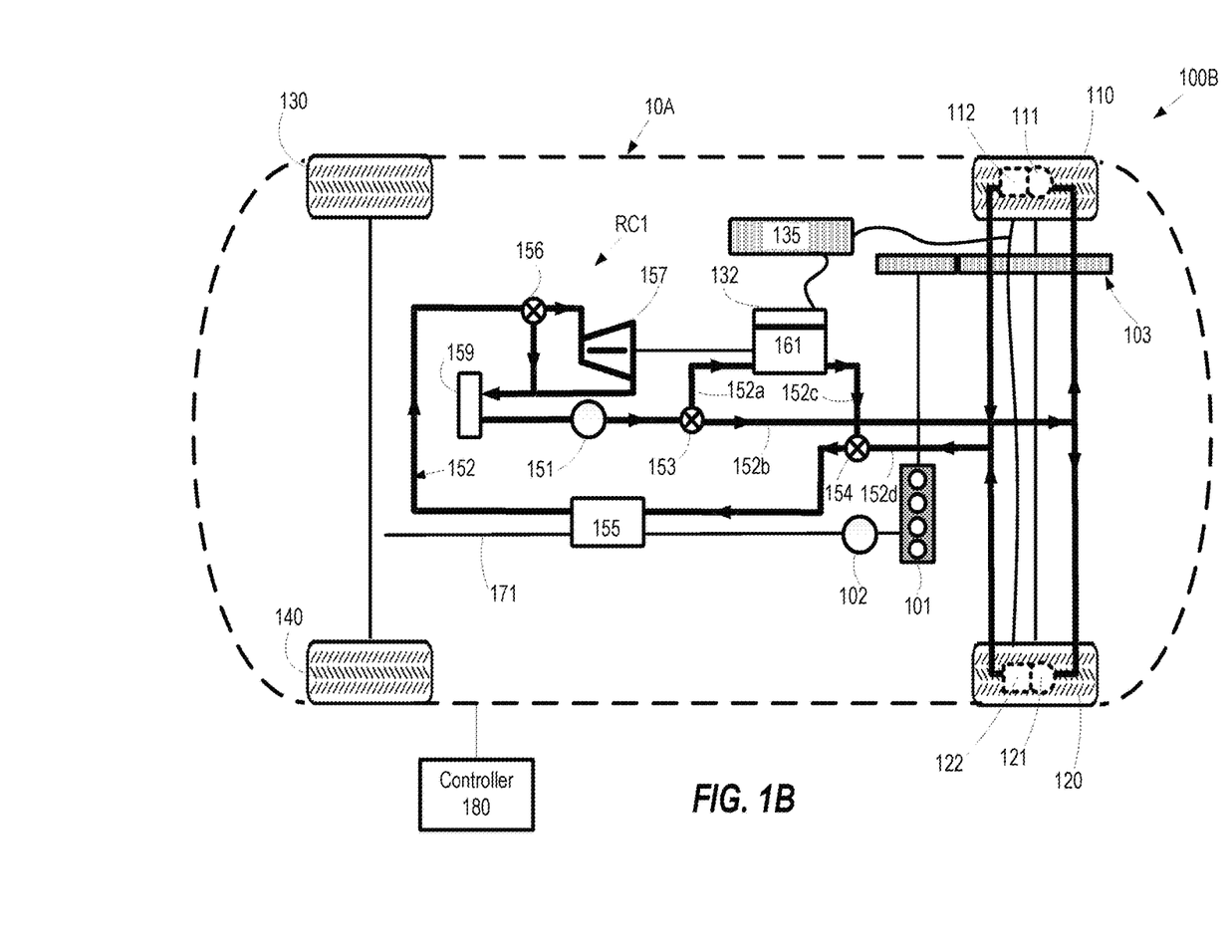
FIG. 1B illustrates a vehicle incorporating a first Rankine Cycle system according to an exemplary embodiment of the present disclosure.

Alternatively, a hybrid vehicle may not include the power split device 105 and still implement the first RC system RC1. FIG. 1B illustrates a hybrid vehicle 100B incorporating the first RC system RC1 according to an exemplary embodiment of the present disclosure. The first RC system RC1 can output mechanical work to the generator 161 to generate electricity, there is no need to split part of the power from the engine 101 to drive the generator 161.

Figure 1C:
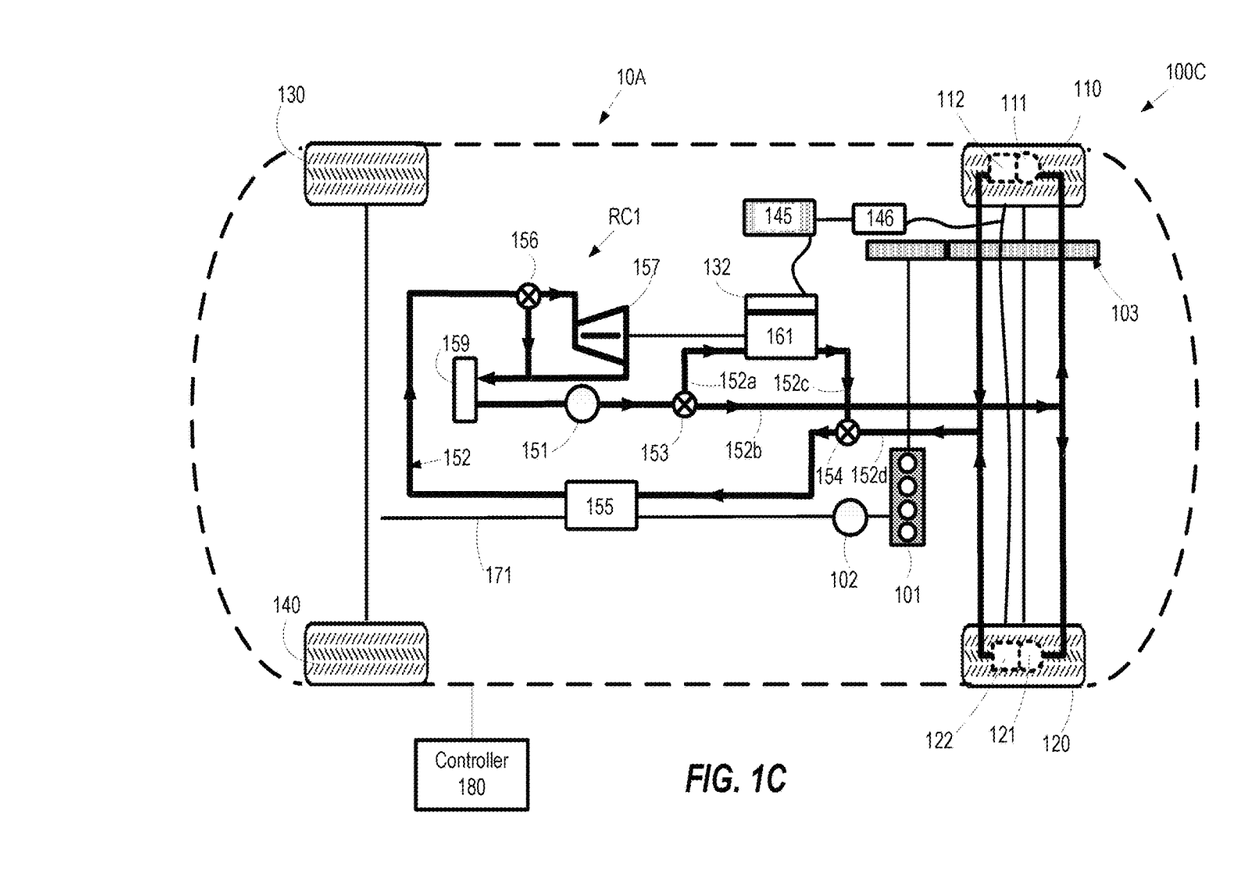
FIG. 1C illustrates a vehicle incorporating a first Rankine Cycle system with battery unit separated into a battery and a boost converter according to an exemplary embodiment of the present disclosure.

In another alternative configuration, shown in FIG. 1C, a hybrid vehicle 100C can incorporate the first Rankine Cycle system RC1 in which the battery unit 135 can be separated into two components battery 145 and the boost converter 146 connected by wiring.

Figure 2A:
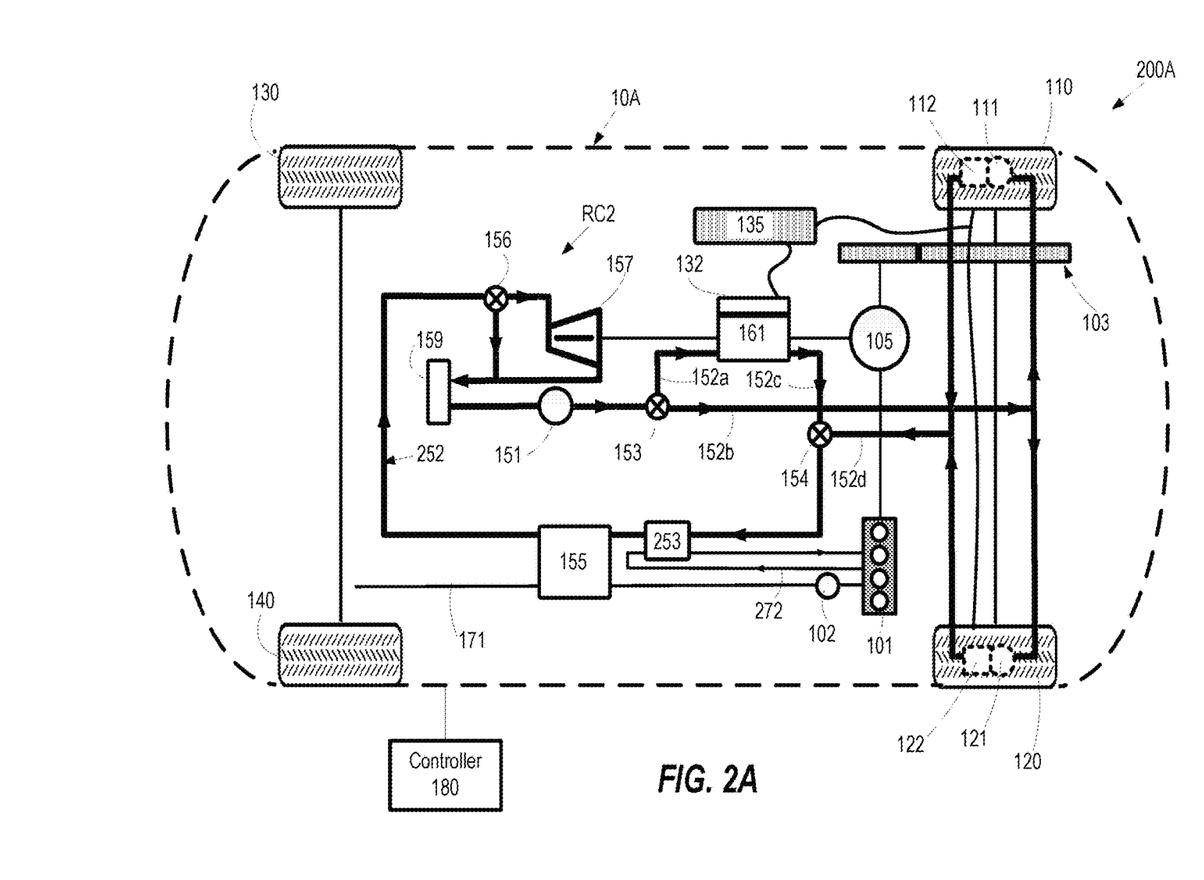
FIG. 2A illustrates a vehicle with a power split incorporating a second Rankine Cycle system according to an exemplary embodiment of the present disclosure.

FIG. 2A illustrates a hybrid vehicle 200A with a power split 105 incorporating a second Rankine Cycle system RC2 according to an exemplary embodiment of the present disclosure. The hybrid vehicle 200A has a similar construction as the hybrid vehicle 100A, except that hybrid vehicle 200A incorporates the second Rankine Cycle system RC2 (referred as second RC system RC2 hereinafter).

The second RC system RC2 includes the pump 151, the first three-way valve 153, the second three-way valve 154, a preheater 253, the evaporator 155, the expander 157, and the radiator 159. Optionally, a bypass valve 156 can be included. The aforementioned components are connected by a RC piping system 252 to form a cooling loop. The RC piping system 252 is similar to the RC piping system 152, where the RC piping system 252 circulates the working fluid (also referred as a refrigerant) through different components of the second RC system RC2 including the preheater 253. The preheater 253 is a heat exchanger that preheats the working fluid before passing through the evaporator 155.

The pump 151 pumps the working fluid through the first three-way valve 153, which cools the power electronics such as the AC-DC inverter 132, the DC-AC inverters 112 and 122, the generator 161 and the motors 111 and 121, as discussed earlier. Furthermore, the working fluid is passed through the preheater 253, which extracts part of the heat from an engine coolant pipe 272. The engine coolant pipe 272 is a part of the engine cooling system typically incorporated in a vehicle. The preheater 253 may evaporate the working fluid by a certain amount (e.g., less than 5%-10%) and increase the amount of vapor in the vapor-liquid mixture. The position of the preheater 253 is not restricted to the shown configuration. The preheater 253 can be placed after the heat exchanger 153 or before the heat exchanger 153. The benefits of the preheater 253 also depend on the type of working fluid. For example, if water is used, then the preheater 253 may not provide additional benefits since the boiling point of water is close to the engine coolant temperature (i.e., approximately 100° C.).

The working fluid is further passed through the evaporator 155, where the working fluid is further heated increasing the vapor content of the working fluid. The working fluid is then passed through the expander 157. As the working fluid recovers heat from one more waste heat source, more work can be produced by the expander 157 compared to that produced in the first RC system RC1. The working fluid further passes through the radiator 159, which converts the working fluid in liquid state and passes to the pump 151.

Furthermore, the controller 180 can be configured to control the operation of the second RC system RC2 in a similar manner as discussed earlier with respect to the first RC system RC1.

Figure 2B:
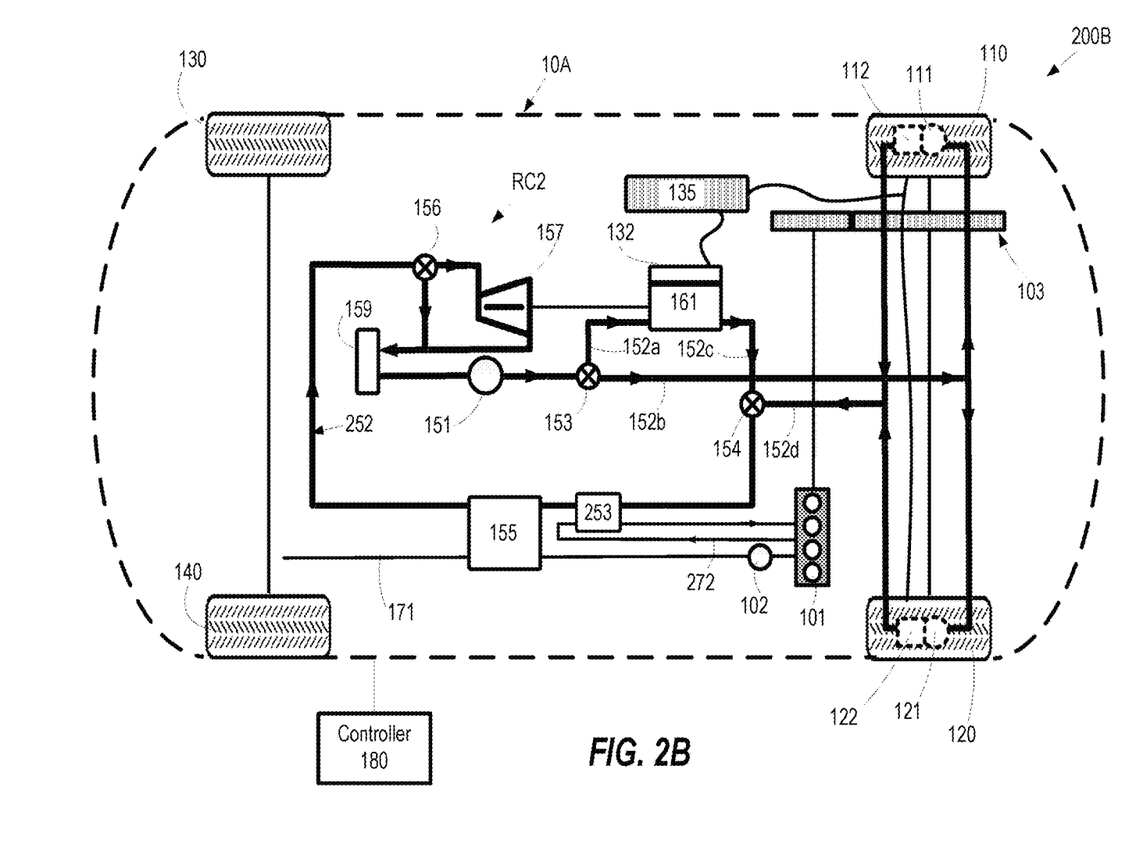
FIG. 2B illustrates a vehicle incorporating a second Rankine Cycle system according to an exemplary embodiment of the present disclosure.

Alternatively, a hybrid vehicle may not include the power split device 105 and still implement the second RC system RC2. FIG. 2B illustrates a hybrid vehicle 200B incorporating a second RC system RC2 according to an exemplary embodiment of the present disclosure. The second RC system RC2 can output mechanical work to the generator 161 to generate electricity, there is no need to split part of the power from the engine 101 to drive the generator 161.

Figure 3A:
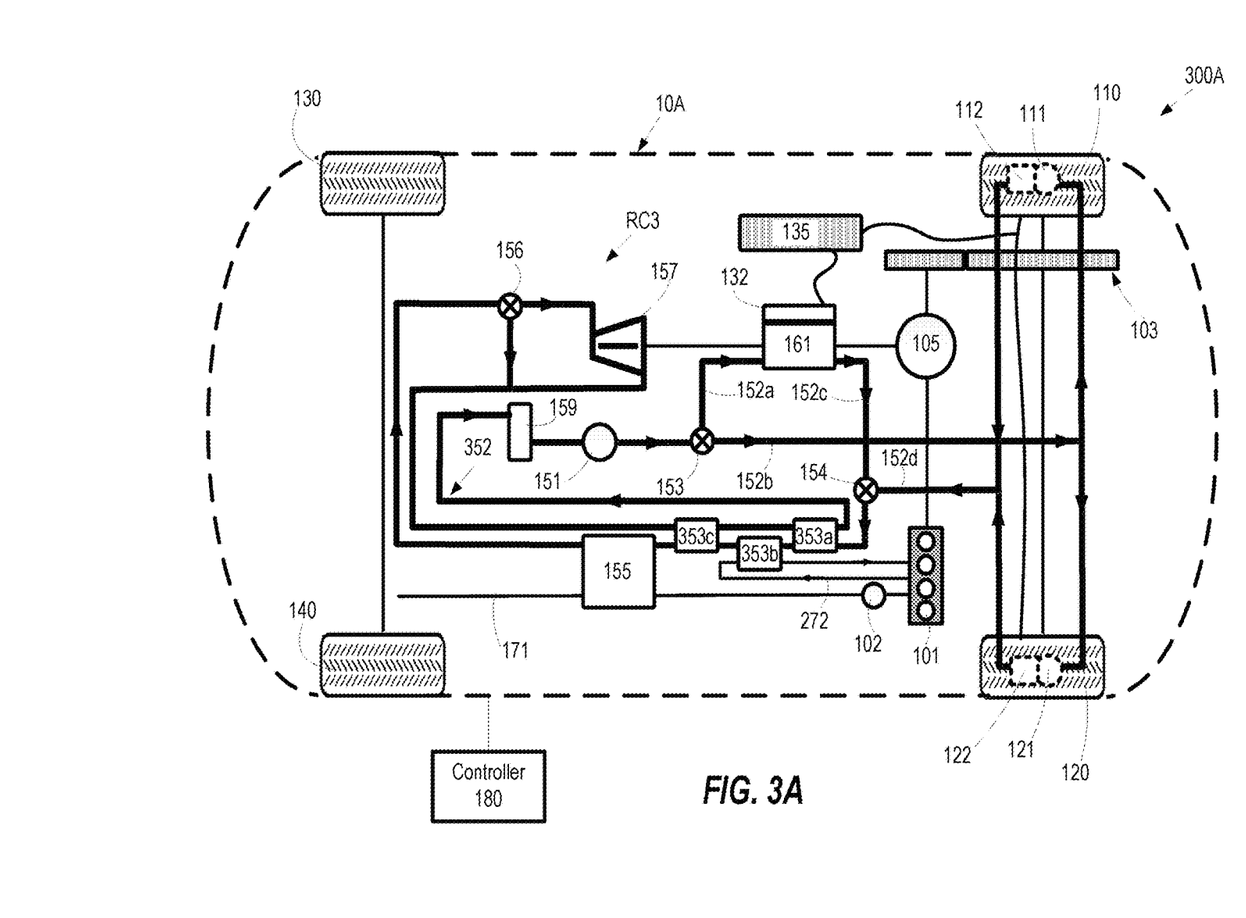
FIG. 3A illustrates a vehicle with a power split incorporating a third Rankine Cycle system according to an exemplary embodiment of the present disclosure.

FIG. 3A illustrates a hybrid vehicle 300A with a power split 105 incorporating a third Rankine Cycle system RC3 according to an exemplary embodiment of the present disclosure. The hybrid vehicle 300A has a similar construction as the hybrid vehicle 100A, except that hybrid vehicle 300A incorporates the third Rankine Cycle system RC3 (referred as third RC system RC3 hereinafter).

The third RC system RC3 includes the pump 151, the first three-way valve 153, the second three-way valve 154, a low temperature recuperator 353b, a preheater 353c, a high temperature recuperator 353d, the evaporator 155, the expander 157, and the radiator 159. Optionally, a bypass valve 156 can be included. The aforementioned components are connected by a RC piping system 352 to form a cooling loop. The RC piping system 352 circulates the working fluid (also referred as a refrigerant) through different components of the third RC system RCS including the low temperature recuperator 353b, the preheater 353c, and the high temperature recuperator 353d.

The low temperature recuperator 353b (also referred as LT recuperator 353b) is a heat exchanger located on the output side of the second three-way valve 154 and before the evaporator 155. The LT recuperator 353b receives the working fluid from the second three-way valve 154 and preheats the working fluid before passing the working fluid to the evaporator 155. The LT recuperator 353b uses heat from the working fluid exiting from the expander 157 for preheating purposes.

The preheater 353c is a heat exchanger that preheats the working fluid output from the LT recuperator 353b and before passing through the evaporator 155. The preheater 353c uses the heat from the engine coolant passing through an engine coolant pipe 272.

The high temperature recuperator 553d (also referred as HT recuperator 353d) is a heat exchanger located after the expander 157 and before the radiator 159. The HT recuperator 353d receives the working fluid from the expander 157, which is used to preheat the working fluid before passing the working fluid to the evaporator 155.

Thus, the working fluid exiting from the expander 157 is precooled twice—first, in the HT recuperator 353d and then in the LT recuperator 353b. While the working fluid is preheated by six heat sources such as the AC-DC inverter 131, the DC-AC inverters 112 and 122, motors 111 and 121, the low temperature recuperator 353b, the preheater 353c, and the high temperature recuperator 353d before entering the evaporator 155. Such heat exchange reduces the temperature differential within the third RC system RC3.

Figure 3B:
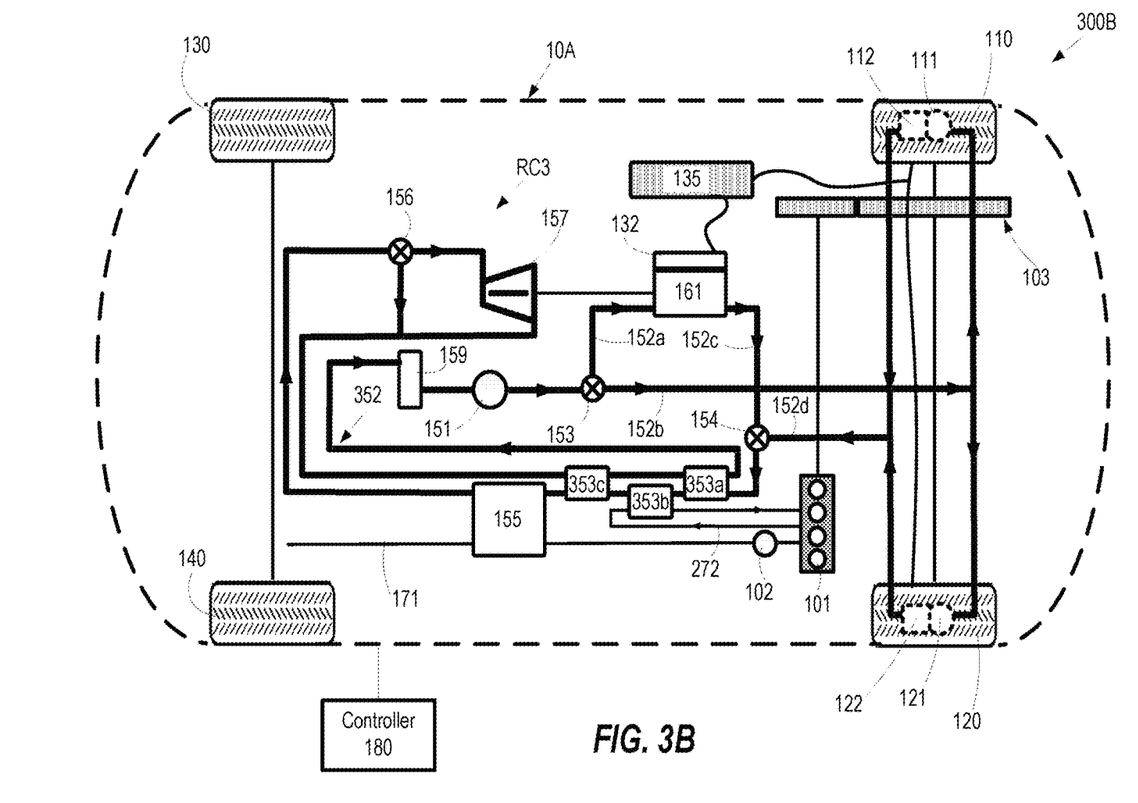
FIG. 3B illustrates a vehicle incorporating a third Rankine Cycle system according to an exemplary embodiment of the present disclosure.
Figure 3C:
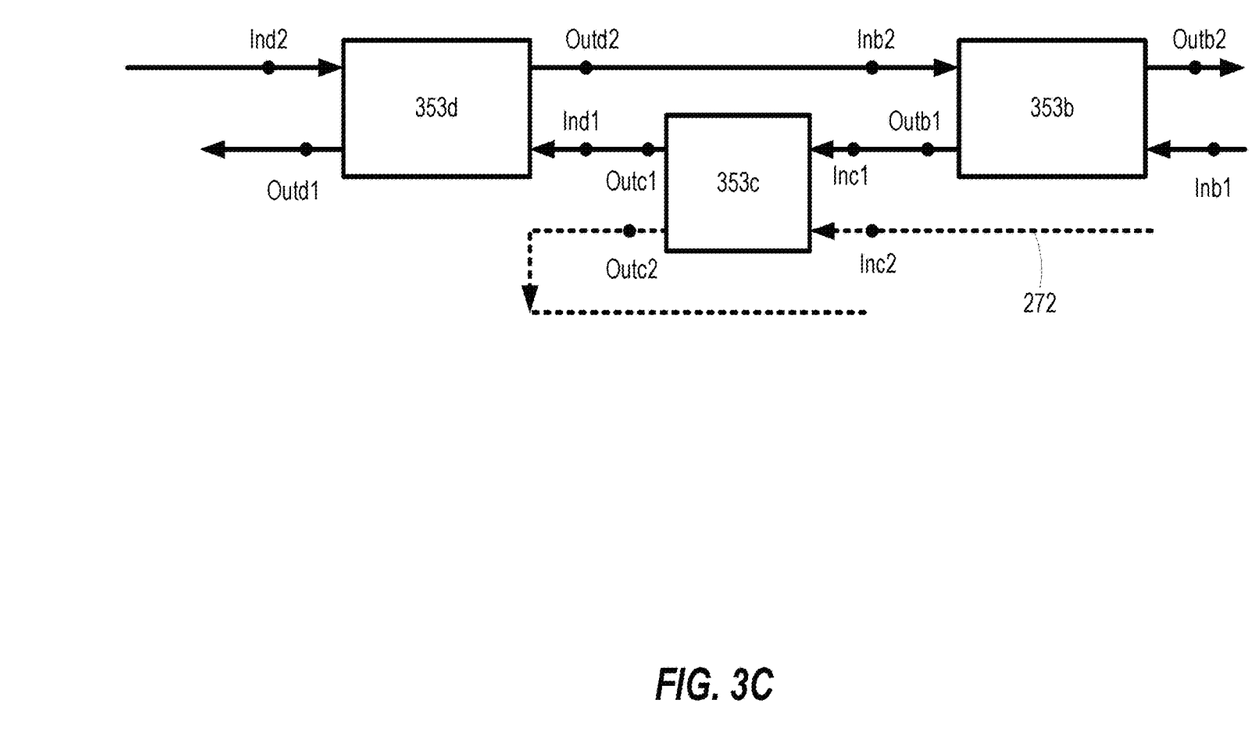
FIG. 3C illustrates the flow of working fluid between a low temperature recuperator, a preheater, and a high temperature recuperator of the third Rankine Cycle system according to an exemplary embodiment of the present disclosure.

FIG. 3C illustrates the flow of working fluid and temperature differences between the low temperature recuperator 353b, the preheater 353c, and the high temperature recuperator 353d. The LT recuperator 353b receives the working fluid at the input Inb1 at a temperature Tinb1 and at the input Inb2 at a temperature Tinb2. The temperature Tinb2 is greater than Tinb1 (Tinb2>Tinb1), which causes the working fluid to preheat and exit at the Outb1 at temperature Tinc1. Simultaneously, the working fluid exits at the Outb2 at a temperature Toutb2, which is lower than Tinb2. Thus, the working fluid going to the evaporator 155 (in FIG. 3A) is preheated, while the working fluid going to the radiator 159 (in FIG. 3A) is precooled.

The output from the LT recuperator 353b is the input to the preheater 353c. As such, the working fluid enters the preheater 353c at an input Inc1 at a temperature Tinc1. Simultaneously, the preheater 353c also receives the engine coolant at input Inc2 at a temperature Tinc2. The temperature Tinc2 is greater than the temperature Tinc1 (Tinc2>Tinc1), which causes the working fluid to preheat and exit at the Outc1 at a temperature Tind1. Also, the temperature of the engine coolant at Outc2 is lowered compared to Tinc2, which can potentially improve the engine cooling efficiency.

The output from the preheater 353c is the input to the HT recuperator 353d. As such, the working fluid enters the HT recuperator 353d at an input Ind1 at a temperature Tind1. Simultaneously, the HT recuperator 353d also receives the working fluid at temperature Tind2. The temperature Tind2 is greater than Tind1 (Tind2>Tind1), which causes the working fluid to preheat and exit at the Outd1 at temperature Tind1. Simultaneously, the working fluid exits at the Outd2 at a temperature Toutd2, which is lower than the temperature Tind2. Thus, the working fluid going to the evaporator 155 (in FIG. 3A) is preheated, while the working fluid going to the radiator 159 (in FIG. 3A) is precooled.

The third RC system RC3 follows temperature relationship as below:

$$Tinb1 < Tinc1 < Tind1, \text{ also expressed as}$$
$$Toutd1 > Toutc1 > Toutb1 > Tinb1$$

$$Tinb2 > Tinb1; \text{ and}$$

$$Tind2 > Tind1$$

Therefore, the third RC system RC3 substantially utilizes the waste heat from power electronics, the exhaust gas, the engine coolant and the working fluid from expander 157, and minimizes the temperature differential between the heat source and the working fluid. Thus, providing a high thermal efficiency. However, since additional components are included for extra heat exchangers, more space is sacrificed.

It can be appreciated by a person skilled in art that the present disclosure is not limited to the RC3 configuration in FIG. 3A and 3B. Alternatively, the LT recuperator 353b and the HT recuperator 353d may not be included the same time. Only one of the LT recuperator 353b and the HT recuperator 353d can be included. Furthermore, the order of the LT recuperator 353b, the preheater 353c, and the HT recuperator 353d can be changed depending on the selected refrigerant and the heat source temperature.

Alternatively, a hybrid vehicle may not include the power split device 105 and still implement the third RC system RC3. FIG. 3B illustrates a hybrid vehicle 300B incorporating the third RC system RC3 according to an exemplary embodiment of the present disclosure.

Figure 4A:
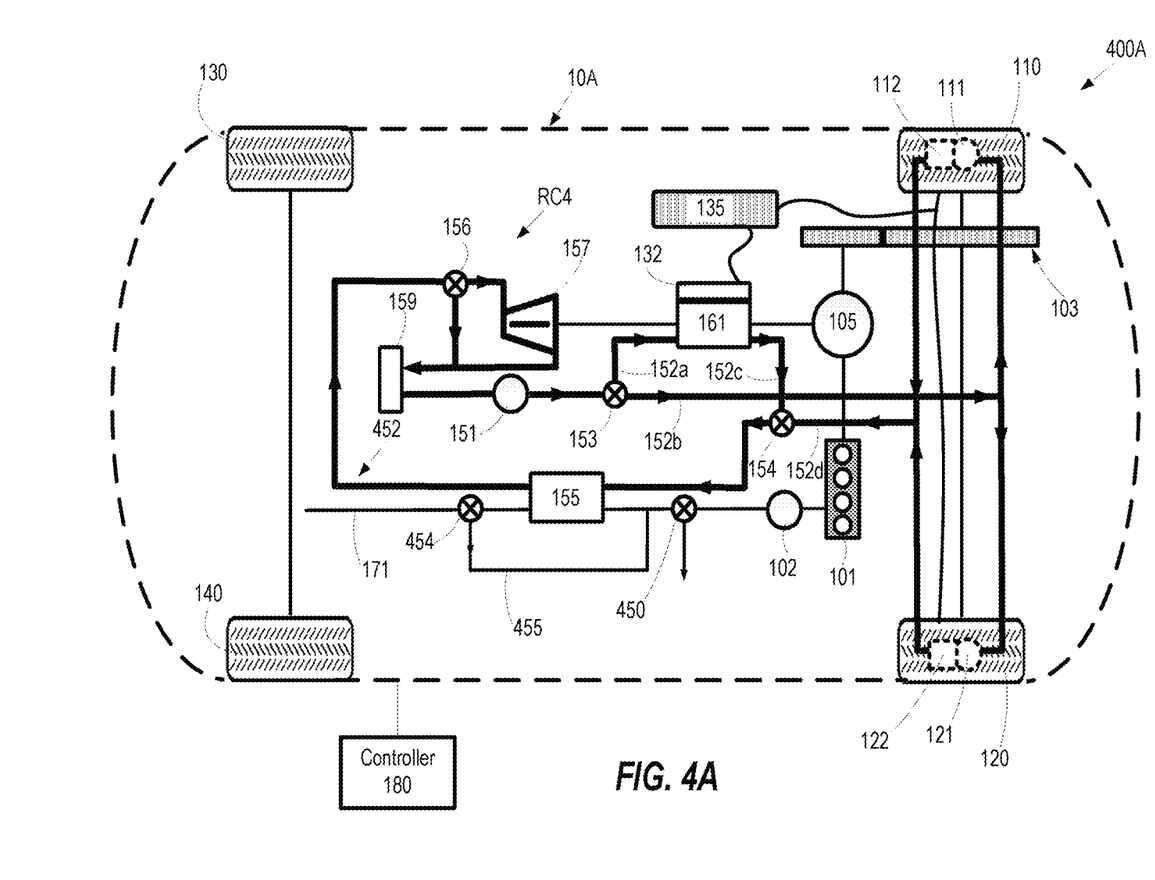
FIG. 4A illustrates a vehicle with a power split incorporating a fourth Rankine Cycle system according to an exemplary embodiment of the present disclosure.
Figure 4B:
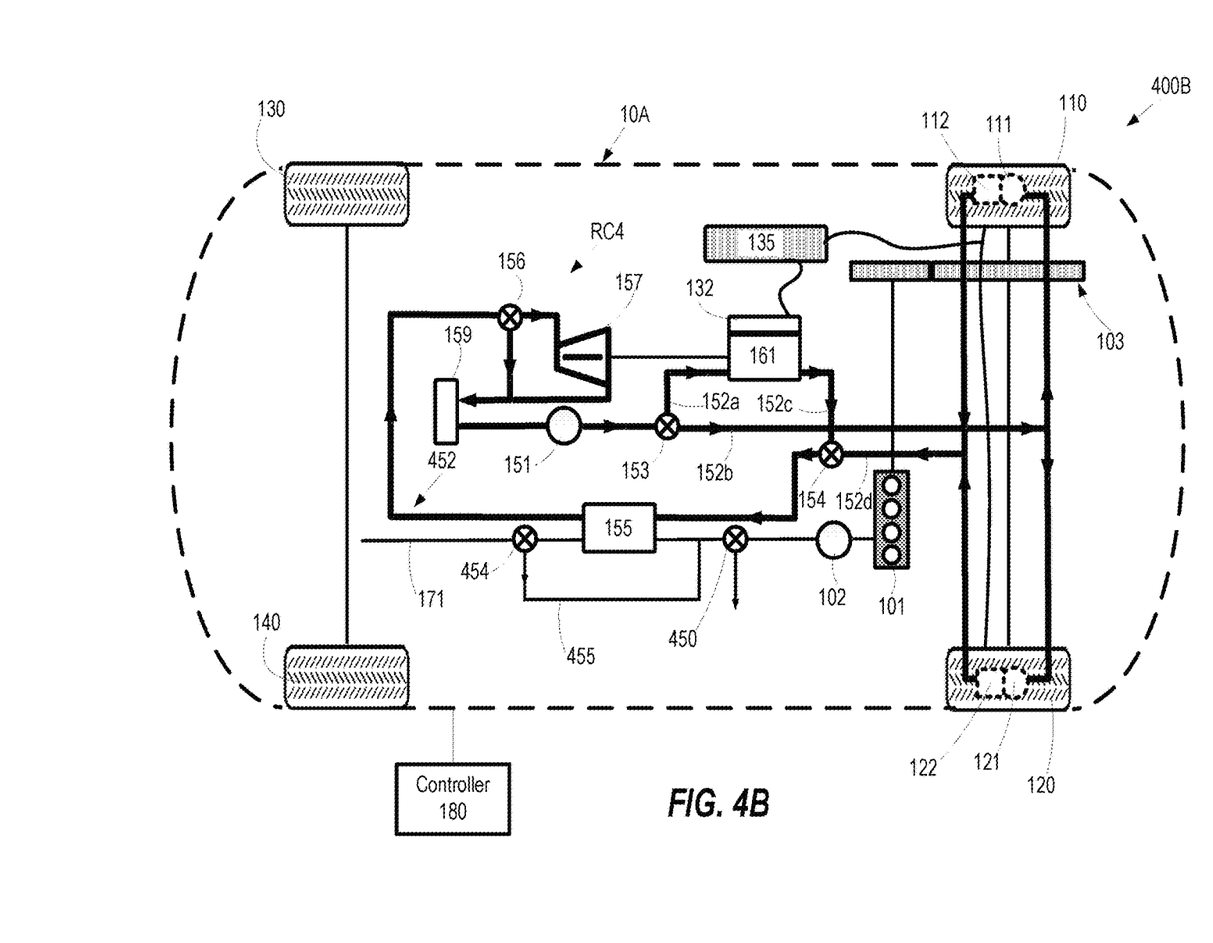
FIG. 4B illustrates a vehicle incorporating a fourth Rankine Cycle system according to an exemplary embodiment of the present disclosure.

FIGS. 4A and 4B illustrate a hybrid vehicle 400A having a power split device 105 and a hybrid vehicle 400B with no power split device, respectively, incorporating a fourth Rankine Cycle system RC4 (referred as fourth RC system RC4) according to an exemplary embodiment of the present disclosure. The fourth RC system RC4 includes an exhaust gas recirculation (EGR) loop formed around the evaporator 155. The EGR loop recirculates the exhaust gas in the exhaust gas pipe 171. The EGR loop includes a first bypass valve 450 at the input side of the evaporator 155, a second bypass valve 454 at the output side of the evaporator 155, a pipe 455 connecting the second bypass valve and the exhaust gas pipe 171.

The exhaust gas from the engine 101 is passed through the first bypass valve 450 to evaporator 155. The exhaust gas exiting the evaporator 155 is then redirected by the second bypass valve 454 to the input side of the evaporator 155. Thus, the exhaust gas flowing out of the evaporator 155 at a low temperature is partially recirculated and mixed with a high-temperature exhaust gas from engine 101. As such, both the flow rate and the exhaust gas temperature at the evaporator 155 inlet can be actively controlled according to the driving profile to provide optimal operating conditions for the fourth RC system RC4. The EGR loop can also be added to the first, second and the third RC systems RC1, RC2, and RC3.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A hybrid vehicle comprising:
   one or more in-wheel motors;
   a power electronics including a DC-AC inverter, a AC-DC inverter, and a converter; and
   a Rankine cycle system comprising
      a pump driving a working fluid through the Rankine cycle system,
      a first valve including an input receiving working fluid from the pump, a first output passing the working fluid through the AC-DC inverter, and a second output passing the working fluid through the one or more in-wheel motors and the DC-AC inverter,
      a second valve including a first input receiving the working fluid exiting from the AC-DC inverter, a second input receiving the working fluid exiting from the one or more in-wheel motors and the DC-AC inverter and an output,
      an evaporator receiving the working fluid from the output of the second valve and heating the working fluid utilizing heat from an exhaust gas from an engine,
      an expander receiving the working fluid from the evaporator, and
      a radiator cooling the working fluid received from the expander.

2. The hybrid vehicle according to claim 1, wherein the AC-DC inverter is integrated with a generator, the DC-AC inverter is integrated with the one or more in-wheel motors and the converter is integrated with a battery.

3. The hybrid vehicle according to claim 1, further comprising a preheater located at the output of the second valve and before the evaporator.

4. The hybrid vehicle according to claim 3, wherein the preheater receives engine coolant to heat the working fluid before passing the working fluid to the evaporator.

5. The hybrid vehicle according to claim 3, further comprising a low temperature recuperator receiving the working fluid at a first temperature from the output of the second valve and the working fluid at a second temperature from the expander.

6. The hybrid vehicle according to claim 5, wherein the second temperature is greater than the first temperature.

7. The hybrid vehicle according to claim 3, further comprising a high temperature recuperator receiving the working fluid at a third temperature from the preheater and the working fluid at a fourth temperature from the expander.

8. The hybrid vehicle according to claim 7, wherein the third temperature is greater than the fourth temperature.

9. The hybrid vehicle according to claim 1, further comprising an exhaust gas recirculation loop around the evaporator partially recirculating the exhaust gas from the output of the evaporator to the input of the evaporator.

10. A Rankine cycle system comprising:
    a pump driving a working fluid through the Rankine cycle system;
    a first valve including an input receiving working fluid from the pump, a first output passing the working fluid through an AC-DC inverter, and a second output passing the working fluid through one or more in-wheel motors and a DC-AC inverter;
    a second valve including a first input receiving the working fluid exiting from the AC-DC inverter, a second input receiving the working fluid exiting from the one or more in-wheel motors and the DC-AC inverter and an output;
    an evaporator receiving the working fluid from the output of the second valve and heating the working fluid utilizing heat from an exhaust gas from an engine;
    an expander receiving the working fluid from the evaporator; and
    a radiator cooling the working fluid received from the expander.

11. The Rankine cycle system according to claim 10, further comprising a preheater located at the output of the second valve and before the evaporator.

12. The Rankine cycle system according to claim 11, wherein the preheater receives engine coolant to heat the working fluid before passing the working fluid to the evaporator.

13. The Rankine cycle system according to claim 12, further comprising a low temperature recuperator receiving the working fluid at a first temperature from the output of the second valve and the working fluid at a second temperature from the expander.

14. The Rankine cycle system according to claim 13, wherein the second temperature is greater than the first temperature.

15. The Rankine cycle system according to claim 14, further comprising a high temperature recuperator receiving the working fluid at a third temperature from the preheater and the working fluid at a fourth temperature from the expander.

16. The Rankine cycle system according to claim 15, wherein the third temperature is greater than the fourth temperature.

17. The Rankine cycle system according to claim 10, further comprising an exhaust gas recirculation loop around the evaporator partially recirculating the exhaust gas from the output of the evaporator to the input of the evaporator.

* * * * *